United States Patent [19]

Rumball

[11] Patent Number: 5,124,688
[45] Date of Patent: Jun. 23, 1992

[54] METHOD AND APPARATUS FOR CONVERTING DIGITAL YUV VIDEO SIGNALS TO RGB VIDEO SIGNALS

[75] Inventor: David A. Rumball, Sunnyvale, Calif.

[73] Assignee: MASS Microsystems, Sunnyvale, Calif.

[21] Appl. No.: 519,977

[22] Filed: May 7, 1990

[51] Int. Cl.$^5$ .............................. G09G 1/28
[52] U.S. Cl. .................... 340/703; 340/799; 358/23
[58] Field of Search .............. 340/703, 799; 358/13 C, 358/23, 30

[56] References Cited

U.S. PATENT DOCUMENTS

| | | | |
|---|---|---|---|
| 4,368,466 | 1/1983 | Dwire | 340/750 |
| 4,598,282 | 7/1986 | Pugsley | 340/703 |
| 4,720,745 | 1/1988 | DeForest et al. | |
| 4,725,828 | 2/1988 | Cowlishaw | 340/703 |
| 4,739,313 | 4/1988 | Oudshoorn et al. | |
| 4,823,120 | 4/1989 | Thompson et al. | |
| 4,829,455 | 5/1989 | Long | 340/703 |

FOREIGN PATENT DOCUMENTS 2143106A 1/1985 United Kingdom .
2167926A 6/1986 United Kingdom .

Primary Examiner—Alvin E. Oberley
Assistant Examiner—Matthew Luu
Attorney, Agent, or Firm—Townsend and Townsend

[57] ABSTRACT

Method and apparatus process a composite video signal, converted it to component video signals which are processed digitally to produce reprogrammable digital RGB graphics signals. Specifically, a composite video signal is first digitized and then processed to convert digitized YUV component video signals into digitized RGB signals by means of a RAM-based table lookup technique optimized to the resolution of each of the component signals so as to minimize memory requirements and computation overhead. In a specific embodiment, a Y or luminance signal having a resolution of 6 bits is employed in connection with a V component signal having a resolution of 5 bits and a U component signal having a resolution of 3 bits without noticeable degradation of RGB color quality.

10 Claims, 2 Drawing Sheets

| RAM ADDRESS LINE | A14 | A13 | A12 | A11 | A10 | A9 | A8 | A7 | A6 | A5 | A4 | A3 | A2 | A1 | A0 |
|---|---|---|---|---|---|---|---|---|---|---|---|---|---|---|---|
| MONOCHROME OUT | X | $Y_7$ | $Y_6$ | $Y_5$ | $Y_4$ | $Y_3$ | $Y_2$ | X | X | X | X | X | X | X | X |
| 8 BIT COLOR OUT | X | $Y_7$ | $Y_6$ | $Y_5$ | $Y_4$ | $Y_3$ | $Y_2$ | $V_7$ | $V_6$ | $V_5$ | $V_4$ | $V_3$ | $U_7$ | $U_6$ | $U_5$ |
| 24 BIT COLOR – R | 0 | $Y_7$ | $Y_6$ | $Y_5$ | $Y_4$ | $Y_3$ | $Y_2$ | $V_7$ | $V_6$ | $V_5$ | $V_4$ | $V_3$ | X | X | X |
| 24 BIT COLOR – G | 1 | $Y_7$ | $Y_6$ | $Y_5$ | $Y_4$ | $Y_3$ | $Y_2$ | $V_7$ | $V_6$ | $V_5$ | $V_4$ | $V_3$ | $U_7$ | $U_6$ | $U_5$ |
| 24 BIT COLOR – B | 0 | $Y_7$ | $Y_6$ | $Y_5$ | $Y_4$ | $Y_3$ | $Y_2$ | $U_7$ | $U_6$ | $U_5$ | $U_4$ | $U_3$ | X | X | X |

X ≡ DON'T CARE

*FIG. 3*

METHOD AND APPARATUS FOR CONVERTING DIGITAL YUV VIDEO SIGNALS TO RGB VIDEO SIGNALS

BACKGROUND OF THE INVENTION

This invention relates to conversion of component video signals of the YUV format of a television system to RGB (Red-Green-Blue) signals of a computer system. In particular, this invention relates to conversion of digitized YUV signals to RGB signals for use as part of a computer displayable image.

Methods and apparatus are known for processing composite television signals through an analog decoder to produce separate analog Red, Green, and Blue (RGB) signals for projection of an image in a display device. It is also known to provide television image processing systems having capture or frame grabbing capabilities in connection with merged display images.

The traditional approach to reproduction on a computer display has been to convert the individual analog Red, Green and Blue signals obtained from analog conversion of composite television signals into separate digital signals and then to provide the digital signals to appropriate display reproduction circuitry of a computer.

Color reproduction requires a color space defined by a minimum of three signals. The composite color television signal can be constructed of three component signals, Y, U and V. The Y signal represents to luminance or picture brightness. The U signal is the scaled difference between the blue value and the luminance (B-Y). The V signal is the scaled difference between the Red value and the luminance (R-Y).

Computer displays of color, however, cannot be reproduced directly from the YUV signals on an RGB-type display device, and hence color space conversion to the RGB format is necessary.

Prior art color space conversion has involved for example a digital 3 by 3 matrix multiplication typically using at least 8-bit multipliers, whereby any arbitrary three-component color system can be converted to any other three-component color system. The approach, although flexible, is expensive or is slowed by direct computation of values.

A second technique for conversion involves bifurcating the multiplication process by first applying a coefficient to a component through a table lookup technique according to a predefined transformation and then summing three components to produce results. While this approach is relatively inexpensive, it lacks the flexibility of a multiplication transformation.

A possible approach is to provide a lookup table having the equivalent of three sets of data inputs (24 lines) and one set of outputs (8 lines), which would be expected to require a lookup table having a capacity of 16 Megabytes. At present, the largest commercial practical lookup table device has a capacity of several orders of magnitude less than such a table. What is needed therefore is a converter having the flexibility of a true matrix multiplier at an expense and level of efficiency exceeding implementation of straightforward table lookup structures.

A sample of the patents in this general field includes U.S. Pat. No. 4,823,120 for an enhanced video graphics controller. This patent describes a current product of Apple Computer with which the output signal of a product incorporating the present invention might be used.

U.S. Pat. No. 4,739,313 describes a device for converting composite video to RGBI signals in which the resolution is limited to only 16 colors. The range of choice of colors is considerably less than the present invention and would be considered inadequate for a digital reproduction of a color television image.

U.S. Pat. No. 4,720,745 describes a method and apparatus for enhancing NTSC composite video signals as part of a conversion into RGB components. This invention does not deal with color conversion but is basically a spatial filter to minimize noise.

SUMMARY OF THE INVENTION

According to the present invention, method and apparatus process a composite video signal, converted it to component video signals which are processed digitally to produce reprogrammable digital RGB graphics signals. Specifically, a composite video signal is first digitized and then processed to convert digitized YUV component video signals into digitized RGB signals by means of a RAM-based table lookup technique optimized to the resolution of each of the component signals so as to minimize memory requirements and computation overhead. In a specific embodiment, a Y or luminance signal having a resolution of 6 bits is employed in connection with a V component signal having a resolution of 5 bits and a U component signal having a resolution of 3 bits without noticeable degradation of RGB color quality.

The invention will be better understood upon reference to the following detailed description in connection with the accompanying figures.

BRIEF DESCRIPTION OF THE DRAWINGS

FIG. 3 is a table illustrating the organization of the internal organization of a random access memory for a specific embodiment of the invention.

DESCRIPTION OF THE PREFERRED EMBODIMENT

Figure 1:
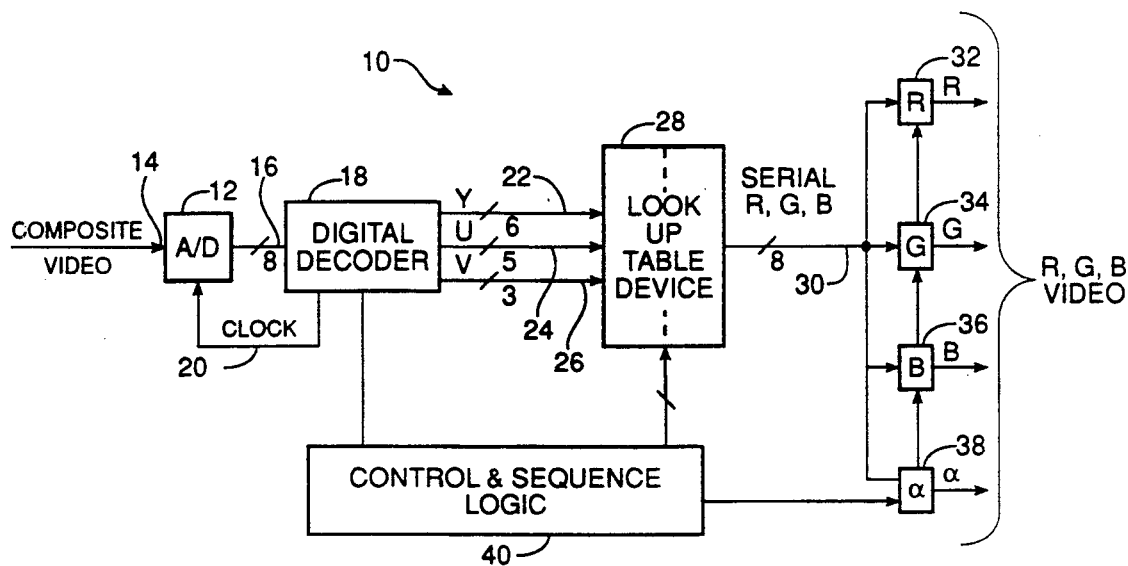
FIG. 1 is a block diagram of a device implementing the invention.

It is helpful to understand the theory of operation of a device according to the invention. A direct conversion of a YUV signal to an RGB signal involves the following conversions.

$$B = U + Y \qquad (1)$$

$$R = V + Y \qquad (2)$$

$$G \approx Y - \tfrac{1}{4}V - 3/16U \qquad (3)$$

Analysis of the above relationships allow that the resolution of values be normalized without substantial degradation in perception of an RGB color image.

It has been determined experimentally that only 6 bits of resolution on the Y component are needed to reproduce a reasonable video signal on a computer display. Therefore, if the component Y is held to a resolution of $N=6$ bits, then the resolution of V need only be held to one-half or $N-1=5$ bits and the resolution of U need only be held one-eighth or $N-3=3$ bits. The sum of the number of bits is then $6+5+3=14$ bits. A 14-bit-wide lookup table therefore requires a very reasonable 16 kilobytes of memory, which can be embodied in a commonly-available 32 kbyte static RAM device, such as a available from a variety of sources. A 32 kbyte lookup table can be coded to perform all of the operations of Equations 1, 2 and 3.

Referring to FIG. 1, there is shown a block diagram of a system 10 in accordance with the invention. It should be understood that this depiction is instructive of a system which may be implemented in the preferred embodiment of a production environment using ASIC technology. All of the functions are implemented, but in a form which may not allow separable identification of each function. However, the teaching herein is intended to allow one of ordinary skill in the art to implement the invention in a straightforward manner.

The system 10 according to the invention includes an analog to digital converter 12 coupled to receive a conventional composite video signal on an input 14, the output of which is an 8-bit digitized sampled composite video signal on line 16, which in turn is fed to a composite-to-YUV digital decoder 18, such as an SAA 9051 and SAA 9057 chip set available from Signetics. A clock output 20 provides a sampling signal to the analog to digital converter 12.

The decoder 18 provides output signals on three sets of lines, Y 22, U 24 and V 26, to address inputs of a lookup table 28.

The lookup table 28 comprises a Random Access Memory device containing data so that the transformation of Equations 1 and 2 above, using the set of signals on address line sets 22, 24 and 26 respectively, to identify the R and B values, occupy a first 16 kbyte segment of the lookup device 28. The transformation of Equation 3 occupies a second 16 kbyte segment of the lookup device 28. The three output values RGB are multiplexed out of the lookup device 28 on a single data output bus 30 to one of four data latches, Red 32, Green 34, Blue 36, and Alpha 38. (The Alpha latch 38 is for use in the Apple Macintosh environment, in which the preferred embodiment is expected to find commercial application, but it is not employed as part of the invention.)

A simple controller/sequencer 40 is provided which is coupled to control the sequencing and timing of the decoder 18, the read and write operation of the lookup table device 28 and the effective multiplexing of signals on bus 30 to the latches 32, 34, 36, 38 and 40. The outputs of the latches 32, 34, 36, and 38 are available as the R, G, B, and Alpha signals to a digital RGB graphic display device, which merely scans the latches for data for each pixel of a display.

Figure 2:
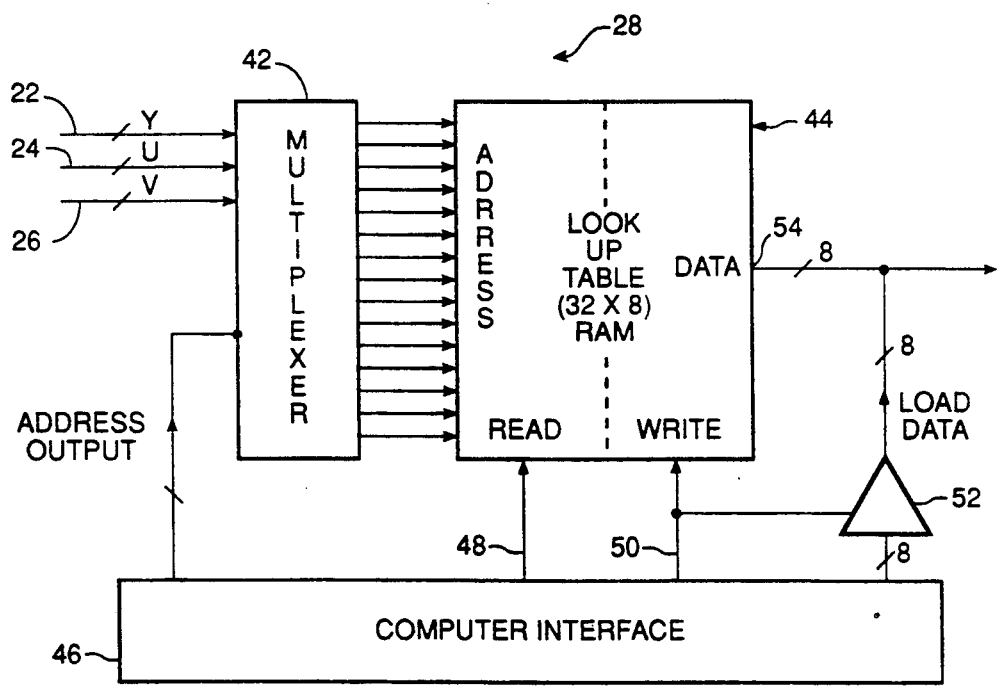
FIG. 2 is a block diagram illustrating details of a table lookup device according to the invention.

FIG. 2 illustrates the lookup device 28, which comprises a multiplexer 42, a RAM 44, and a computer interface 46. The Y, U, and V signals on line sets 22, 24, and 26 are coupled to the multiplexer 42, which in turn furnishes 15 lines as address inputs to a 32X8 RAM 44, which can either be read at the initiation of a read enable signal at control line 48 or written to at the initiation of a write enable signal at control line 50. The multiplexer 42 in one mode furnishes the RAM 44 with address data of the YUV signals to allow the table to be read out or in another mode with address data from the computer interface 46 allowing a computer (not shown) to load the transformation values into the RAM 44 through drivers 52 coupled to data port 54. This allows the computer to interactively change the color transformations of the YUV color to RGB color, which is particularly useful in an Apple Macintosh environment. The output of port 54 is provided to the latches 32, 34, 36, and 38 under control of the sequencer 40 (FIG. 1).

FIG. 3 is a table illustrating the address mapping of the luminance and color components of the lookup table. Address bits labeled A0 through A13 represent the three sets of data signals, namely, the Y component provided as six bits of address value on the lines A13 through A8, the V component provided as five bits of address value on the lines A7 through A3, and the U component provided as three bits of address value on the lines A2 through A0. A fifteenth bit A14 is used to switch between the first and second segments of the lookup table, thereby distinguishing between processing of the R and B signals on the one hand and the G signal on the other hand, in accordance with Equations 1, 2 and 3 above.

For 8-bit color, the bit A14 is ignored, because the data in each half of the table are presumed to be identical. For monochrome output, this bit is similarly ignored, as both halves of the table are presumed to be loaded with identical data, and the V and U information is unnecessary. The V and U positions of the table are ignored in both halves of the table.

For computation of the 24 bit color red component, the table is identified by a 0 indicating the lower half of the table, and only the most significant 5 bits of the V information is loaded in the bits A7 through A3 of that segment of the table. For computation of the 24 bit color blue component, the transformation programmed into the table is identical but the input information requires the U information. This process is also identified by a 0 indicating the lower half of the table, but only the most significant 5 bits of the U information is loaded in the bits A7 through A3 of that segment of the table. To process the 24 bit green component, the table used is identified by a 1 on the A14 address line, indicating the upper half of the table, which stores the transformation of Equation 3, above. Only the 5 most significant bits of the U information and the three most significant bits of the V information is employed in this transformation.

The selection of values for the transformation are typically determined by the computer environment. For example, in an Apple Macintosh computer, a selection of 256 possible colors is selected on an ongoing basis from selected points in the RGB color space for distribution as points of discrete colors according to the lookup transformation.

Native color in the Macintosh is an RGB color space with 16 bits for each component, and a color manager controls the manipulation of the colors. The color manager performs a best fit according to the physically available colors in the display (i.e., the 8-bit color case). That color value is then used for determining the value stored in the table 28 for transformation. In the case of higher resolution color, the most significant bits are used and the lower significant bits are ignored.

In the so-called true color case, the transformation is more direct because actual RGB color values are reproduced. The table is simply filled with the correct values from an Apple Macintosh color manager.

The invention has now been explained with reference to specific embodiments. Other embodiments will be apparent to those of ordinary skill in the art in light of this disclosure. It is therefore not intended that this invention not be limited except as indicated by the appended claims.

What is claimed is:

1. A method for converting digitized YUV component video signals to digitized RGB graphics signals for an RGB color graphics display of a computer, said method comprising the steps of:
   placing digitized transformation values for individual R, G and B component signals into a lookup table means based on a set of conversions from individual digitized Y, U, and V component signals, the R and B transformation values occupying a first segment of the lookup table means, and the G transformation values occupying a second segment of the lookup table means;
   selectively directing combinations of said digitized Y, U, and V component signals of selected limited resolution to address inputs of said lookup table means to effect reference to said R, G, and B transformation values; and
   sequentially reading out R component transformed values, B component transformed values and said G component transformed values to respective R, B and G latches in accordance with said address inputs.

2. The method according to claim 1 wherein said directing step comprises directing said V component signal at one half resolution of said Y component signal and said U component signal at one eighth resolution of said Y component signal together with said Y component signal during transformation of said G component signal.

3. The method according to claim 2 wherein said directing step comprises directing said V component signal at one half resolution of said Y component signal together with said Y component signal during transformation of said R component signal.

4. The method according to claim 3 wherein said directing step comprises directing said U component signal at one half resolution of said Y component signal together with said Y component signal during transformation of said B component signal.

5. The method according to claim 2 wherein said directing step comprises directing said U component signal at one half resolution of said Y component signal together with said Y component signal during transformation of said B component signal.

6. An apparatus for converting digitized YUV component video signals to digitized RGB graphics signals for an RGB color graphics display of a computer, said apparatus comprising:
   table lookup means for storing digitized transformation values for individual R, G and B component signals based on a set of conversions from individual digitized Y, U, and V component signals, the R and B transformation values occupying a first segment of the lookup table means, and the G transformation values occupying a second segment of the lookup table means;
   means coupled to receive digitized Y, U and V component signals for selectively addressing address inputs of said table lookup means with combinations of said Y, U and V component signals, said addressing means providing selected limited resolution of said U and V component signals for said address inputs, in order to effect reference to said R, G, and B transformation values; and
   means for sequentially reading out R component transformed values, B component transformed values and said G component transformed values to respective R, B and G latches in accordance with said address inputs.

7. An apparatus for converting digitized YUV component video signals to digitized RGB graphics signals for an RGB color graphics display of a computer, said apparatus comprising:
   table lookup means for storing digitized transformation values for individual R, G and B component signals based on a set of conversions from individual digitized Y, U, and V component signals, the R and B transformation values occupying a first segment of the lookup table means, and the G transformation values occupying a second segment of the lookup table means;
   means coupled to receive digitized Y, U and V component signals for selectively addressing address inputs of said table lookup means with combinations of said Y, U and V component signals, said addressing means providing selected limited resolution of said U and V component signals for said address inputs, in order to effect reference to said R, G, and B transformation values; and
   means for sequentially reading out R component transformed values, B component transformed values and said G component transformed values to respective R, B and G latches in accordance with said address inputs, wherein said addressing means comprises a multiplexer, said multiplexer having parallel inputs for said Y, U, and V component signals and parallel outputs for selected combinations of the most significant bits of said Y, U, and V component signals.

8. The apparatus according to claim 7 wherein said multiplexing means further includes an output for one bit value for selecting between said first segment and said second segment.

9. The apparatus according to claim 7 further including means coupled to said addressing means and to said multiplexing means for writing said digitized transformation values for individual R, G and B component signals to said table lookup means.

10. The apparatus according to claim 9 wherein multiplexing means comprises means for directing said V component signal at one half resolution of said Y component signal and said U component signal at one eighth resolution of said Y component signal together with said Y component signal to said table lookup means during transformation of said G component signal.

* * * * *